UNITED STATES PATENT OFFICE.

RICHARD DIERBACH, OF HAMBURG, GERMANY.

PROCESS OF MANUFACTURING POROUS CHOCOLATE.

1,044,758.  Specification of Letters Patent.  Patented Nov. 19, 1912.

No Drawing.   Application filed July 8, 1912.   Serial No. 708,224.

*To all whom it may concern:*

Be it known that I, RICHARD DIERBACH, a subject of the King of Prussia, German Emperor, residing at the city of Hamburg, in the State of Hamburg, German Empire, have invented certain new and useful Improvements in Processes of Manufacturing Porous Chocolate, of which the following is a specification.

This invention has for its object to provide an improved process for the manufacture of porous chocolate from a mixture of cocoa and sugar which is comparatively poor in fat.

A chocolate mass which is poor in fat can be worked only to a moderate extent in the mixing and grinding machines, because if it is worked beyond a certain degree it loses its plasticity owing to the fact that the cocoa butter is absorbed by the sugar to an increasing extent as the sugar becomes finer. The chocolate must therefore be richer in fat (which is the binding agent) the greater the degree of fineness to which the chocolate is ground, that is to say, the finer the sugar has become. For this reason it has been proposed to add a small quantity of water, say about 1 to 1½ per cent., to the chocolate mass that is poor in fat before or during its treatment in the mixing or grinding machine. This water serves to keep the sugar somewhat moist so that the latter will absorb less of the fat which is required to bind the cocoa and sugar together for producing a chocolate mass that can be molded. It has also been proposed for the purpose of enabling a chocolate mass poor in fat to be worked up more in the mixing machines and grinding roller mills and yet remain plastic to add to such chocolate some more water (up to 4 per cent.) together with a binding agent, for instance agar-agar, starch flour, gelatin or a silicate of an alkali, which is dissolved or swelled in the added water. The cocoa fat then forms with the water and the binding agent, when worked up, an intimate emulsion which imparts to the constituents of the chocolate mass a consistency that will allow of molding the same.

Now the present invention consists substantially in the use of a concentrated solution of sugar as a means of binding together the constituents of the chocolate mass.

According to this invention there are added to a chocolate mass that is poor in fat, about 5 to 10 per cent. of water which forms with a part of the sugar a syrup when heated during the working. The cocoa mass, water and sugar or syrup are worked up together in the mixing machine into a homogeneous mass which in contradistinction from ordinary chocolate cannot be molded into cakes in the usual chocolate molds. The large amount of added water allows however of finely grinding the non-moldable mass in roller mills so that the said mass forms on the surface of the rollers tough thin sheets resembling gutta-percha, which are scraped off into a receptacle. In this receptacle the said layers collect to form a loose spongy mass from which the moisture that is not bound by the sugar evaporates during storage. In this manner there is produced a very porous and crumbly chocolate mass of melting character such as has not been attainable hitherto in the working of chocolate masses that are poor in fat.

It has already been proposed after working up a chocolate mass that is rich in fat, in a roller grinding mill, to scrape it off the rollers into molds for the purpose of making chocolate of bark-like appearance; such chocolate can, however, be made only from chocolate mass that is rich in fat.

The following is an example of the carrying out of the present invention. 70 parts of sugar are intimately mixed in a mixing machine with 5 to 10 parts of water and 30 parts of cocoa mass containing about 50 to 55 per cent. of fat. When a uniform mass has been produced the same is worked up in a roller grinding mill such as is otherwise used as a rule only for a chocolate mass rich in fat. After repeated treatment in the mill the chocolate mass acquires a tough consistency and forms on the surface of the rollers thin guttapercha-like layers which are scraped off and collected in boxes wherein they unite to form a spongy porous mass. This mass when cold is divided into blocks. The water that is not bound by the sugar is then allowed to evaporate and the spongy blocks are divided by sawing or cutting into cubes, disks, etc. In contradistinction to molded chocolate of equal poorness in fat the improved chocolate mass is of considerably greater fineness and has a very pleasant delicate flavor, it melts readily on the tongue.

The melting of this improved chocolate in eating is due to the circumstances that the sugar in the mass owing to the fineness and high degree of porosity of the latter is immediately dissolved by the saliva. The chewing of the improved chocolate produces therefore a thorough mixing of the saliva with the mass whereby its digestion is promoted in an extraordinary degree. In the case of the melting chocolates hitherto known the melting sensation on the tongue is due to the liquefaction by the heat of the cocoa fat which is present in abundance, and the pulp which is thus formed in chewing is naturally not prepared so favorably for digestion. The sugar (saccharose) in the mixture may be replaced wholly or partly by other kinds of sugar, for instance glucose. The contained sugar adapted to retain moisture prevents the mass from becoming too dry and crumbly.

I claim:

The process of manufacturing porous chocolate consisting in working up a mass of sugar, cocoa and water in grinding and mixing machines, scraping off the tough layers on the surface of the machine rollers and collecting said layers in a receptacle for uniting to form a porous mass, allowing the free water to evaporate from the mass, and then dividing the mass into blocks, substantially as described.

In testimony whereof I affix my signature in presence of two witnesses.

RICHARD DIERBACH.

Witnesses:
ERNEST H. L. MUMMENHOFF,
FRANCIS R. STEWART.